United States Patent
Massey et al.

(10) Patent No.: US 7,971,828 B2
(45) Date of Patent: Jul. 5, 2011

(54) AIRCRAFT FUEL TANK AND INERTING SYSTEM THEREFOR

(75) Inventors: Alan Massey, Hampshire (GB); John Wood, Hampshire (GB); Dominic Ashton, Hampshire (GB)

(73) Assignee: Eaton Aerospace Limited, Hampshire (GB)

( * ) Notice: Subject to any disclaimer, the term of this patent is extended or adjusted under 35 U.S.C. 154(b) by 486 days.

(21) Appl. No.: 10/590,716

(22) PCT Filed: Feb. 28, 2005

(86) PCT No.: PCT/GB2005/000724
§ 371 (c)(1),
(2), (4) Date: Apr. 26, 2007

(87) PCT Pub. No.: WO2005/082712
PCT Pub. Date: Sep. 9, 2005

(65) Prior Publication Data
US 2008/0017248 A1 Jan. 24, 2008

Related U.S. Application Data

(60) Provisional application No. 60/548,106, filed on Feb. 27, 2004.

(30) Foreign Application Priority Data

Feb. 26, 2004 (GB) .................................. 0404278.4

(51) Int. Cl.
*B64D 37/32* (2006.01)
(52) U.S. Cl. .................................. 244/135 R; 220/88.3
(58) Field of Classification Search .............. 244/135 R; 220/88.3
See application file for complete search history.

(56) References Cited

U.S. PATENT DOCUMENTS

| 3,590,559 | A |   | 7/1971  | Bragg et al. |          |
|-----------|---|---|---------|--------------|----------|
| 3,628,758 | A | * | 12/1971 | Nichols ..................... | 244/135 R |
| 3,788,039 | A | * | 1/1974  | Bragg ............................. | 96/174 |
| 4,378,920 | A |   | 4/1983  | Runnels et al. |  |
| 4,556,180 | A | * | 12/1985 | Manatt ....................... | 244/135 R |
| 5,820,659 | A | * | 10/1998 | Ekiner et al. ........................ | 96/8 |
| 6,547,188 | B2 | * | 4/2003 | Schmutz et al. .......... | 244/135 R |
| 2002/0158167 | A1 | * | 10/2002 | Schmutz et al. ........... | 244/129.2 |

FOREIGN PATENT DOCUMENTS

| DE | 44 36 747 | 5/1996 |
| EP | 0 405 597 | 1/1991 |
| EP | 1 253 077 | 10/2002 |
| WO | WO 00/00389 | 1/2000 |
| WO | WO 2004/002826 | 1/2004 |

OTHER PUBLICATIONS

"Fuel Tank Flammability Minimization." USDOT Advisory Circular #25.981-2. Apr. 18, 2001.*

* cited by examiner

*Primary Examiner* — Tien Dinh
*Assistant Examiner* — Michael Kreiner
(74) *Attorney, Agent, or Firm* — Young & Thompson

(57) ABSTRACT

An inerting system for an aircraft fuel tank (10) uses an air separation device (12) to produce a supply of nitrogen-enriched air to replenish the fuel tank on consumption of fuel and to maintain the pressure difference across the walls of the tank (10) below design limits. The air separation device (12) provides substantially the whole of the mass of the gas required and so there is substantially no inward venting. This provides a substantially homogenous nitrogen content in the air in the tank (10).

9 Claims, 1 Drawing Sheet

AIRCRAFT FUEL TANK AND INERTING SYSTEM THEREFOR

Figure 1:
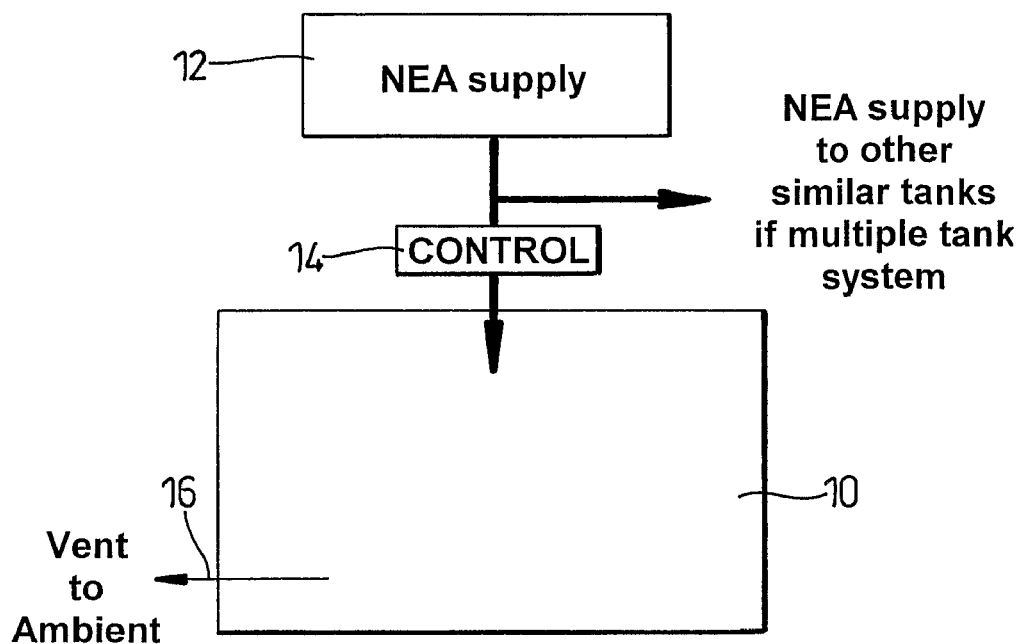

This invention relates to aircraft fuel tank systems and to methods for inerting aircraft fuel tanks.

Regulations require that the fuel tanks of civil aircraft are rendered inert, that is to say that the flammability hazard posed by the fuel tank is reduced, by maintaining the oxygen concentration below a preset figure; this is typically 11.9% but can vary from 9% to 12%. It will be appreciated that an inflow of gas into the aircraft fuel tank is required both to make up for the burn rate of the fuel exiting the tank, and also to maintain the pressure differential across the tank within particular structural design limits during descent. The mass flow rate required during descent is therefore relatively high as a substantial mass is required to pressurize the tank.

It is known to generate nitrogen-enriched air using an air separation device such as a system using Hollow Fibre Membrane technology to separate air into oxygen and nitrogen, and to provide nitrogen-enriched air in which the concentration of nitrogen is greater than in ambient air, and the concentration of oxygen is lower.

In prior art systems, ambient air is permitted to enter the fuel tanks during descent, and nitrogen-enriched air of sufficient flow and purity is added to the tank to ensure that the overall average oxygen concentration does not exceed the defined limits for an inert tank (typically 11.9% oxygen by volume at sea level). In such systems, towards the end of the descent, the nitrogen-enriched air is supplied at a concentration of between 10% to 12% oxygen concentration (by volume) and, when eventually mixed with ambient air, a typical mixture concentration of 16% to 18% oxygen concentration results.

A problem with this system is that the introduction of ambient air is via the aircraft fuel vent system which is typically designed with the fuel system requirements in mind, and has inlets in only a limited number of locations in the tank. This means that, during the descent phase, air introduced via the vent systems tends to create localised pockets within the tank where the oxygen concentration exceeds the defined limit. In tanks divided into compartments or bays, this can result in an entire bay in which the vent is located exceeding the limit.

There is a need for an aircraft fuel tank inerting system capable of overcoming or mitigating at least some of the disadvantages of existing systems.

Accordingly, in one aspect, this invention provides an aircraft fuel tank system comprising:

at least one aircraft fuel tank;

an air separation means for producing nitrogen-enriched air, and control means operable to control said air separation means to supply nitrogen-enriched air into said at least one aircraft fuel tank during cruise conditions and to supply nitrogen-enriched air at a higher flow rate during descent, whereby substantially the whole of the mass of gas required to maintain the pressure difference across the walls of the fuel tank below a design threshold is provided by said air separation means.

In this arrangement, during the descent phase, instead of replenishing the tanks with a mixture of ambient air derived from the vent system, in combination with nitrogen-enriched air from the air-separation device, the air-separation device is operated to provide a high flow rate of nitrogen-enriched air in which the concentration of nitrogen is relatively low.

The term "nitrogen-enriched air" is used in this specification to mean air which has passed through an air-separation device including separation means intended to increase the nitrogen content in the air with a commensurate reduction in the oxygen content.

Although we do not preclude the possibility of inward venting of air into the aircraft fuel tank, in the preferred embodiments the control means controls the air-separation means so that the whole of the mass of the gas required to maintain said pressure difference is provided by said air-separation means, and so there is no inward venting.

In the described embodiment, the air-separation means provides in use nitrogen-enriched air having a relatively high concentration of nitrogen when operated at relatively low mass flow rates but with the concentration of nitrogen decreasing at higher mass flow rates.

In the above arrangements, although by operating the air-separation means at higher mass flow rates means that the purity of the nitrogen-enriched air is degraded, in most instances the nitrogen-enriched air supplied from the air-separation means will still have a nitrogen concentration which is higher than that of ambient air.

A major advantage of this system is that it does not rely in mixing within the aircraft fuel tanks of ambient air and nitrogen-enriched air and so variations in concentration of the nitrogen across the tank are reduced, thereby reducing localised oxygen-rich pockets.

Preferably, the system includes means for distributing the nitrogen-enriched air at a number of spaced locations in said at least one aircraft fuel tank, thereby in use to reduce variations in concentration of nitrogen within said tank.

The air-separation means may take many forms, but preferably comprises a Hollow Fibre Membrane.

In another aspect, this invention provides an aircraft fuel tank system comprising:

at least one aircraft fuel tank;

means for providing nitrogen-enriched air for delivery into said at least one tank, and means for distributing said nitrogen-enriched air at a number of spaced locations within said at least one tank.

Preferably, substantially the entire amount of nitrogen-enriched air introduced into the at least one fuel tank is drawn from said nitrogen-enriched air providing means.

In another aspect, this invention provides a method of inerting at least one aircraft fuel tank which comprises operating an air separation device during cruise conditions to deliver nitrogen-enriched air with a relatively high concentration of nitrogen at a relatively low mass flow rate into said aircraft fuel tank, and operating said air separation device during descent conditions to deliver nitrogen-enriched air with a lower concentration of nitrogen and at a relatively high mass flow rate, whereby the air-separation device provides substantially the whole of the mass of gas required to maintain the pressure difference across the walls of the or each fuel tank within a design threshold.

Whilst the invention has been described above, it extends to any inventive combination of the features set out above or in the following description.

Figure 2:
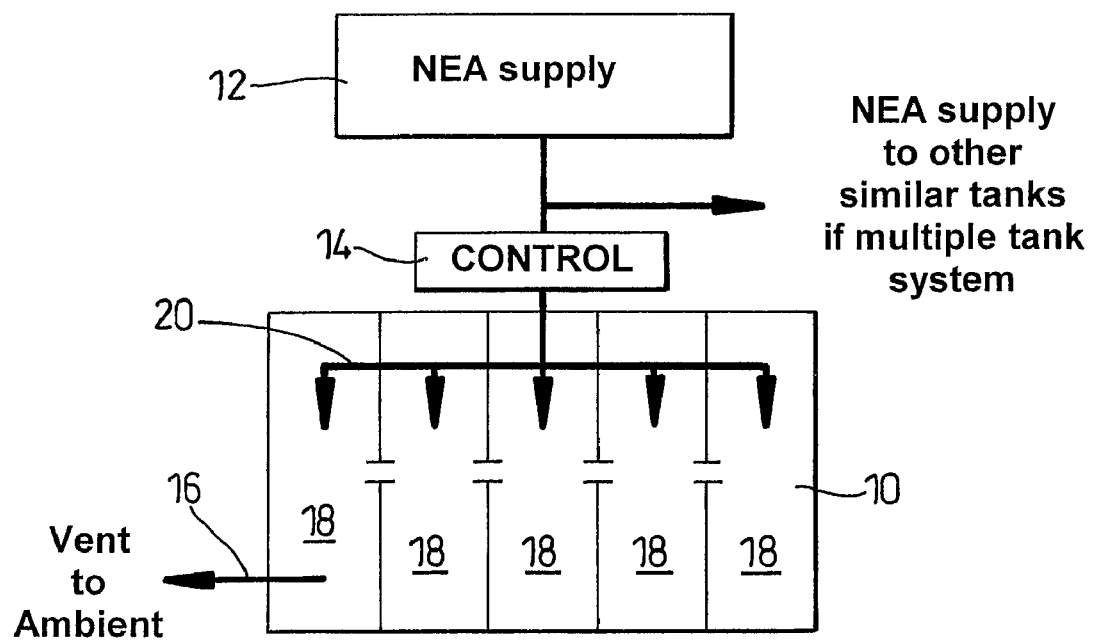

The invention may be performed in various ways, and an embodiment thereof will now be described by way of example only, reference being made to the accompanying drawings, in which:

FIG. 1 is a schematic view of a single volume tank incorporating an inerting system in accordance with this invention, and FIG. 2 is a schematic view of a tank divided into interconnecting bays incorporating an inerting system in accordance with this invention.

Referring to FIG. 1, in this embodiment the aircraft fuel tank 10 is connected to a source 12 of nitrogen-enriched air via a control valve 14. The source of nitrogen-enriched air may be any suitable form of air-separation device, typically implementing Hollow Fibre Membrane technology. The fuel tank also includes a vent 16 for outwardly venting gas.

In use, during descent, little or no ambient air is introduced into the fuel tank but instead nitrogen-enriched air is supplied at a sufficient flow rate, at a degraded purity of nitrogen (greater than 11.9% oxygen concentration at sea level) to maintain the fuel tank at sufficient purity to remain within the oxygen concentration limit. It will be appreciated that that, at the beginning of the descent phase, the tank will have a relatively high purity of nitrogen due to the build up of nitrogen-enriched air during the cruise condition. During the descent phase the flow rate and purity of the nitrogen-enriched air from the source 12 may typically be approximately equivalent to that of the mixture of nitrogen-enriched air and ambient air supplied in the prior art systems. A major advantage of the present system is that the inflow of gas into the fuel tank is substantially homogenous, thereby reducing the possibility of oxygen-rich pockets.

The supply of nitrogen-enriched air may then be distributed to multiple locations within the tank to reduce the size, duration and oxygen concentration of the local pockets at the distribution outlets at which oxygen concentration exceeds 11.9%.

During the ascent phase, where the reducing external pressure causes the gas within the tank to expand, the expanding gas may exit through the vent system 16, without additional control valves or system logic.

Due to the characteristics of a Hollow Fibre Membrane separator, the weight of the inerting system is not significantly changed in the described system as compared to prior art systems.

The system of FIG. 1 may be used where there is just one aircraft fuel tank or where there are multiple tanks.

Referring to FIG. 2, this shows an arrangement where there is a single tank which has a series of inter-connected bays 18. Again, there may be other similar tanks connected to the same source 12 of nitrogen-enriched air. Here a flow distribution pipe 20 distributes the nitrogen-enriched air into each of the bays to effect distribution to multiple locations.

The invention claimed is:

1. An aircraft fuel tank system comprising:
   at least one aircraft fuel tank;
   an air separation device producing nitrogen-enriched air, and
   a control device controlling said air separation device to supply nitrogen-enriched air into said at least one aircraft fuel tank during cruise conditions and to supply nitrogen-enriched air at a higher flow rate during descent, whereby the air separation device provides the whole of the mass of gas required to maintain the pressure of the fuel tank at or above the ambient pressure during descent.

2. The aircraft fuel tank system as claimed in claim 1, wherein said air separation device in use provides nitrogen-enriched air having a high concentration of nitrogen at low mass flow rates, and a low concentration of nitrogen at high mass flow rates, wherein said high concentration is higher than said low concentration, and said high mass flow rate is higher than said low mass flow rate.

3. The aircraft fuel tank system as claimed in claim 2, including a distribution network distributing the nitrogen-enriched air at a number of spaced locations in said at least one aircraft fuel tank, thereby in use to reduce variations in concentration of nitrogen within said tank.

4. The aircraft fuel tank system as claimed in claim 3, wherein said air separation device comprises a Hollow Fibre Membrane.

5. The aircraft fuel tank system as claimed in claim 2, wherein said air separation device comprises a Hollow Fibre Membrane.

6. The aircraft fuel tank system as claimed in claim 1, including a distribution network distributing the nitrogen-enriched air at a number of spaced locations in said at least one aircraft fuel tank, thereby in use to reduce variations in concentration of nitrogen within said tank.

7. The aircraft fuel tank system as claimed in claim 6, wherein said air separation device comprises a Hollow Fibre Membrane.

8. The aircraft fuel tank system as claimed in claim 1, wherein said air separation device comprises a Hollow Fibre Membrane.

9. A method of inerting at least one aircraft fuel tank, comprising:
   operating an air separation device during cruise conditions to deliver nitrogen-enriched air with a high concentration of nitrogen at a low mass flow rate into said aircraft fuel tank; and
   operating said air separation device during descent conditions to deliver nitrogen-enriched air with a lower concentration of nitrogen and at a high mass flow rate, whereby the air-separation device provides the whole of the mass of gas required to maintain the pressure difference across the walls of the or each fuel tank at or above the ambient pressure during descent,
   wherein said high concentration is higher than said low concentration, and said high mass flow rate is higher than said low mass flow rate.

* * * * *